United States Patent
Ishikawa et al.

(10) Patent No.: US 11,151,321 B2
(45) Date of Patent: Oct. 19, 2021

(54) ANAPHORA RESOLUTION

(71) Applicant: INTERNATIONAL BUSINESS MACHINES CORPORATION, Armonk, NY (US)

(72) Inventors: Shunsuke Ishikawa, Tokyo (JP); Yasuyuki Tominaga, Saitama (JP); Hiroaki Uetsuki, Machida (JP); Asako Ono, Setagaya (JP); Tohru Hasegawa, Tokyo (JP); Kenta Watanabe, Soka (JP)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 16/708,566

(22) Filed: Dec. 10, 2019

(65) Prior Publication Data

US 2021/0174022 A1    Jun. 10, 2021

(51) Int. Cl.
*G06F 40/289* (2020.01)
*G06F 40/211* (2020.01)
*G06F 40/35* (2020.01)

(52) U.S. Cl.
CPC .......... *G06F 40/289* (2020.01); *G06F 40/211* (2020.01); *G06F 40/35* (2020.01)

(58) Field of Classification Search
CPC ....... G06F 40/289; G06F 40/211; G06F 40/35
USPC .......................................................... 704/9
See application file for complete search history.

(56) References Cited

U.S. PATENT DOCUMENTS

| | | | | |
|---|---|---|---|---|
| 9,754,591 | B1* | 9/2017 | Kumar | G10L 15/183 |
| 9,767,501 | B1* | 9/2017 | Schaaf | G06Q 30/0623 |
| 10,133,736 | B2* | 11/2018 | Allen | G06F 40/247 |
| 2005/0049852 | A1* | 3/2005 | Chao | G06F 40/30 704/9 |
| 2005/0108001 | A1* | 5/2005 | Aarskog | G06F 40/253 704/10 |

(Continued)

FOREIGN PATENT DOCUMENTS

| | | |
|---|---|---|
| CN | 107590123 A | 1/2018 |
| CN | 108446268 A | 8/2018 |

(Continued)

OTHER PUBLICATIONS

Fujixerox, "Human Position Detection and Technology", https://translate.google.com/translate?hl=en&sl=ja&u=https://www.fujix . . . , printed Dec. 10, 2019, p. 1.

(Continued)

*Primary Examiner* — Edwin S Leland, III
(74) *Attorney, Agent, or Firm* — Kristofer L. Haggerty

(57) ABSTRACT

A method, a structure, and a computer system for resolving an anaphora. The exemplary embodiments may include extracting individual context data from an individual expression and determining whether the individual expression includes an anaphora representation based on the individual context data. The exemplary embodiments may further include, based on determining that the individual expression includes the anaphora representation, extracting anaphora context data and identifying an object of one or more objects to which the anaphora representation refers based on comparing the individual context data and the anaphora context data to data detailing the one or more objects.

20 Claims, 6 Drawing Sheets

(56) References Cited

U.S. PATENT DOCUMENTS

| | | | | |
|---|---|---|---|---|
| 2005/0197828 | A1* | 9/2005 | McConnell | G06F 40/169 |
| | | | | 704/9 |
| 2016/0154787 | A1* | 6/2016 | Allen | G06F 40/211 |
| | | | | 704/9 |
| 2017/0228367 | A1* | 8/2017 | Pasupalak | G06F 16/90332 |
| 2018/0060299 | A1* | 3/2018 | Bastide | H04L 51/32 |
| 2018/0260472 | A1* | 9/2018 | Kelsey | G06F 40/30 |
| 2019/0243895 | A1* | 8/2019 | Allen | G06F 40/35 |
| 2019/0258659 | A1* | 8/2019 | Allen | G06F 16/3344 |
| 2020/0272648 | A1* | 8/2020 | Hasegawa | G06F 16/313 |
| 2021/0042393 | A1* | 2/2021 | Ishikawa | G06K 9/00456 |
| 2021/0049200 | A1* | 2/2021 | Watanabe | G06F 21/128 |
| 2021/0174022 | A1* | 6/2021 | Ishikawa | G06F 40/35 |

FOREIGN PATENT DOCUMENTS

| | | |
|---|---|---|
| CN | 110348012 A | 10/2019 |
| JP | 2006127089 A | 5/2006 |

OTHER PUBLICATIONS

Mell et al., "The NIST Definition of Cloud Computing", National Institute of Standards and Technology, Special Publication 800-145, Sep. 2011, pp. 1-7.

International Search Report and Written Opinion, International Application No. PCT/IB2020/061523, International filing date: Dec. 4, 2020, dated Apr. 15, 2021, pp. 1-9.

* cited by examiner

ANAPHORA RESOLUTION

BACKGROUND

The exemplary embodiments relate generally to text mining, and more particularly to contextual text mining.

An anaphora is a word referring to or replacing a word used earlier in a sentence. For example, in the sentence "I want this," the pronoun "this" is an anaphora referring to an object. The technology for analysing and determining an object to which such a pronoun refers is known as anaphora resolution. Though anaphoras are commonly used and understood in natural language, the rising popularity of chatbots, virtual assistants, and other human-computer interfaces have generated a need for techniques that can quickly and effectively resolve anaphora in computer-based systems, particularly when user input data may be limited.

Under conventional anaphora resolving systems, anaphora resolution relied primarily on the analysis of speech throughout a dialogue. For example, U.S. Pat. No. 9,754,591 B1 describes a method of resolving anaphora wherein users may engage in conversations with a computing device in order to initiate some function or obtain some information. A dialog manager may manage the conversations and store contextual data regarding one or more of the conversations. Processing and responding to subsequent conversations may benefit from the previously stored contextual data by, e.g., reducing the amount of information that a user must provide if the user has already provided the information in the context of a prior conversation.

Improvements to speech-based techniques used in resolving anaphora have been contemplated through, for example, collecting additional information regarding the anaphora representation. For example, U.S. Pat. No. 9,767,501 B1 describes a method for resolving anaphora wherein a user may provide a voice input via a microphone and may activate a scanner to scan an item identifier (e.g., a barcode). The handheld device may communicate voice data and item identifier information to a remote system for voice-assisted scanning. The remote system may perform automatic speech recognition (ASR) operations on the voice data and may perform item identification operations based on the scanned identifier. Natural language understanding (NLU) processing may be improved by combining ASR information with item information obtained based on the scanned identifier.

Yet further conventional approaches to resolving anaphora have been contemplated and, overall, there have been a variety of conventional approaches to improving anaphora resolution. However, each of these conventional approaches fail to consider other contextual data regarding an anaphora representation.

SUMMARY

The exemplary embodiments disclose a method, a structure, and a computer system for resolving an anaphora. The exemplary embodiments may include extracting individual context data from an individual expression and determining whether the individual expression includes an anaphora representation based on the individual context data. The exemplary embodiments may further include, based on determining that the individual expression includes the anaphora representation, extracting anaphora context data and identifying an object of one or more objects to which the anaphora representation refers based on comparing the individual context data and the anaphora context data to data detailing the one or more objects.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
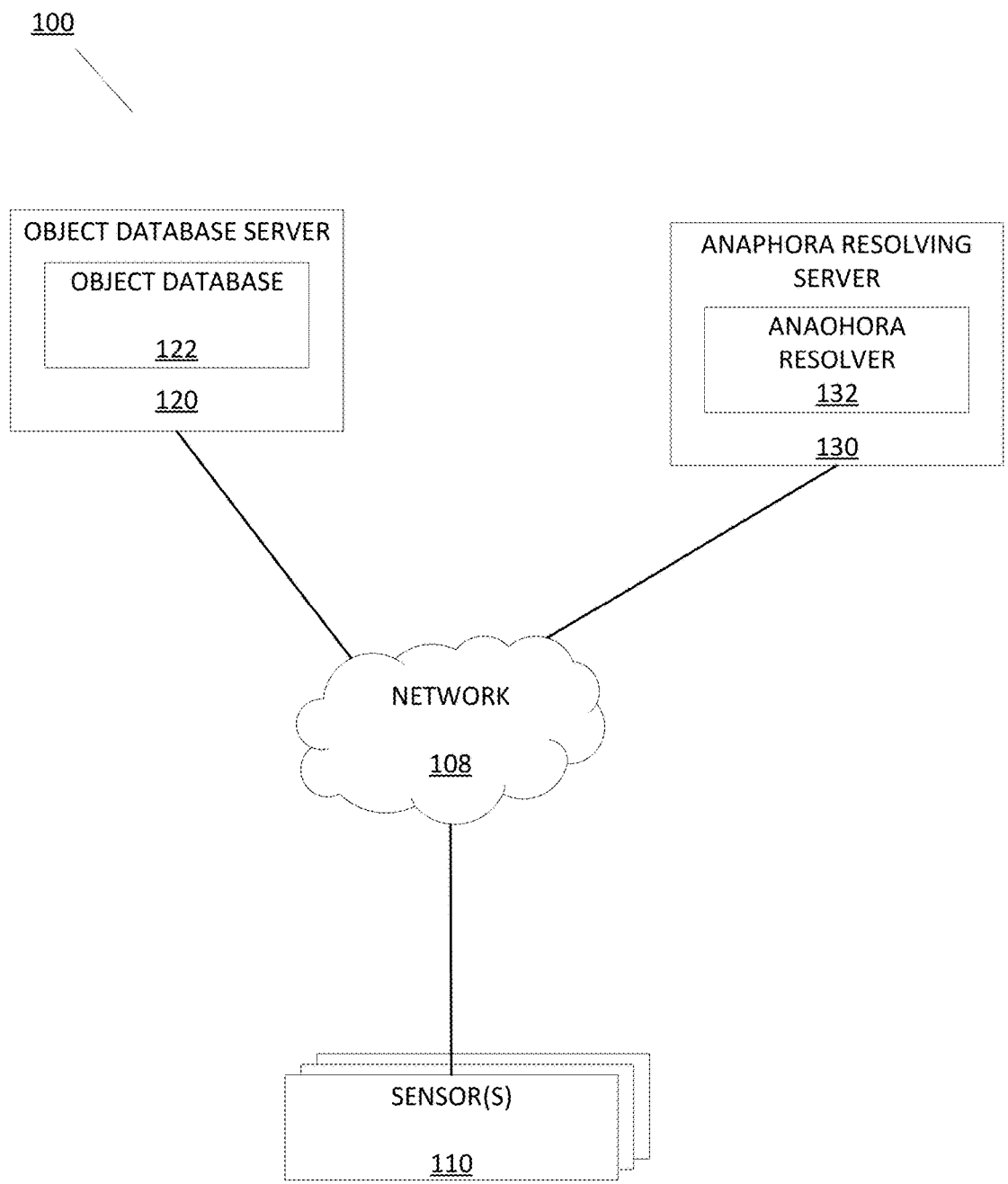
FIG. 1 depicts an exemplary schematic diagram of an anaphora resolving system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

An anaphora is a word referring to or replacing a word used earlier in a sentence. For example, in the sentence "I want this," the pronoun "this" is an anaphora referring to an object. The technology for analysing and determining an object to which such a pronoun refers is known as anaphora resolution. Though anaphoras are commonly used and understood in natural language, the rising popularity of chatbots, virtual assistants, and other human-computer interfaces have generated a need for techniques that can quickly and effectively resolve anaphora in computer-based systems, particularly when user input data may be limited.

The present invention proposes a technique of improving the accuracy of anaphora resolutions by specifying an object corresponding to a conversation target using not only the contents of spoken text, but also contextual data such as user positioning and orientation, user line of sight, object metadata, etc. User positioning/orientation and lines of sight may be deduced from sensors such as cameras, smart phones, etc., while the object metadata may be stored in a local or remote database, and include, for example, a place, color, shape, etc. of an object that may be the object referred to in an anaphora representation. Based on the gathered contextual information, the system may then determine a most likely object to which the anaphora representation refers to, as will be described in greater detail herein.

The present invention improves on existing anaphora resolution techniques by incorporating contextual information regarding users and an environment into a natural language and data analysis. Highlights of the exemplary embodiments include increased anaphora resolution accuracy, thereby resulting in improved accuracy and efficiency of natural language processing and textual mining techniques. Use cases of the exemplary embodiments include anaphora resolution in natural language throughout various settings, such as use in personal assistants, a retail setting, work setting, presentation setting, etc. Detailed description of the exemplary embodiments follows.

FIG. 1 depicts the anaphora resolving system 100, in accordance with exemplary embodiments. According to the exemplary embodiments, the anaphora resolving system 100 may include one or more sensor(s) 110, an object database server 120, and a anaphora resolving server 130, which all may be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted. For example, in embodiments, the anaphora resolver 132 and necessary components may be stored on the sensor 110 for use locally without the need to connect to the network 108. The operations of the anaphora resolving system 100 are described in greater detail herein.

In the exemplary embodiments, the network 108 may be a communication channel capable of transferring data between connected devices. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a Wi-Fi network, or a combination thereof. The network 108 may operate in frequencies including 2.4 gHz and 5 gHz internet, near-field communication, Z-Wave, Zigbee, etc. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices.

In exemplary embodiments, the sensor(s) 110 may be one or more devices capable of collecting data. In particular, the sensor(s) 110 may be configured to collect contextual information within an environment in which the anaphora resolving system 100 may be implemented, for example that depicted by FIG. 3. In embodiments, the sensor(s) 110 may collect user data such as user position/orientation, movement, line of sight, speaking action, gesturing motion, etc. In some embodiments, the sensor 110 may additionally collect object data such as object position, color, shape, etc., and may be further configured to periodically update object metadata within the object database server 120. According to some embodiments, the sensor(s) 110 may be positioned within the environment, for example a camera, microphone, network, etc., while in other embodiments, the sensor(s) 110 may be mobile, such as a computer, smart phone, smart watch, smart glasses, smart contact lens, etc. In general, the sensor(s) 110 may be any device capable of collecting user and/or object information within an environment. The sensor(s) 110 are described in greater detail with respect to FIG. 2-5.

In exemplary embodiments, the object database server 120 includes an object database 122, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of sending an receiving data to and from other computing devices. While the object database server 120 is shown as a single device, in other embodiments, the object database server 120 may be comprised of a cluster or plurality of computing devices, in a modular manner, etc., working together or working independently. The object database server 120 is described in greater detail as a hardware implementation with reference to FIG. 5, as part of a cloud implementation with reference to FIG. 6, and/or as utilizing functional abstraction layers for processing with reference to FIG. 7.

The object database 122 may be a repository of information and metadata regarding one or more objects. In embodiments, the one or more objects may represent an object to which an anaphora refers, and may be real world objects, such as people, places, things, etc., as well as virtual objects, such as that depicted on a screen, monitor, virtual/augmented/diminished reality, etc. Moreover, the object database 122 may include information and metadata describing the one or more objects, such as object shape, color, size, barcode, stock keeping unit (SKU), media access control (MAC) address, internet protocol (IP) address, location (e.g., coordinates within a 3D representation of the environment), a textual description of the object, etc. In embodiments, the object database 122 may be populated and periodically updated, for example, via user input or via reference to the sensor(s) 110. The object database 122 is described in greater detail with respect to FIG. 2-5.

In the exemplary embodiments, the anaphora resolving server 130 may include n anaphora resolver 132, and may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the anaphora resolving server 130 is shown as a single device, in other embodiments, the anaphora resolving server 130 may be comprised of a cluster or plurality of computing devices, working together or working independently. The anaphora resolving server 130 is described in greater detail as a hardware implementation with reference to FIG. 5, as part of a cloud implementation with reference to FIG. 6, and/or as utilizing functional abstraction layers for processing with reference to FIG. 7.

In the exemplary embodiments, the anaphora resolver 132 may be a software and/or hardware program that may be capable of extracting individual context data from dialogue and/or actions between one or more individuals within an environment. In addition, the anaphora resolver 132 may be capable of determining whether the individual context data includes an anaphora representation and, if so, extracting anaphora context data from the user dialogue and/or actions. Moreover, the anaphora resolver 132 is capable of matching the anaphora representation to an object based on the extracted individual context data and extracted anaphora context data. The anaphora resolver 132 is further capable of scoring and ranking the matches between the anaphora representation and the one or more objects, and further adjusting models that score the matches. The anaphora resolver 132 is described in greater detail with reference to FIG. 2-5.

Figure 2:
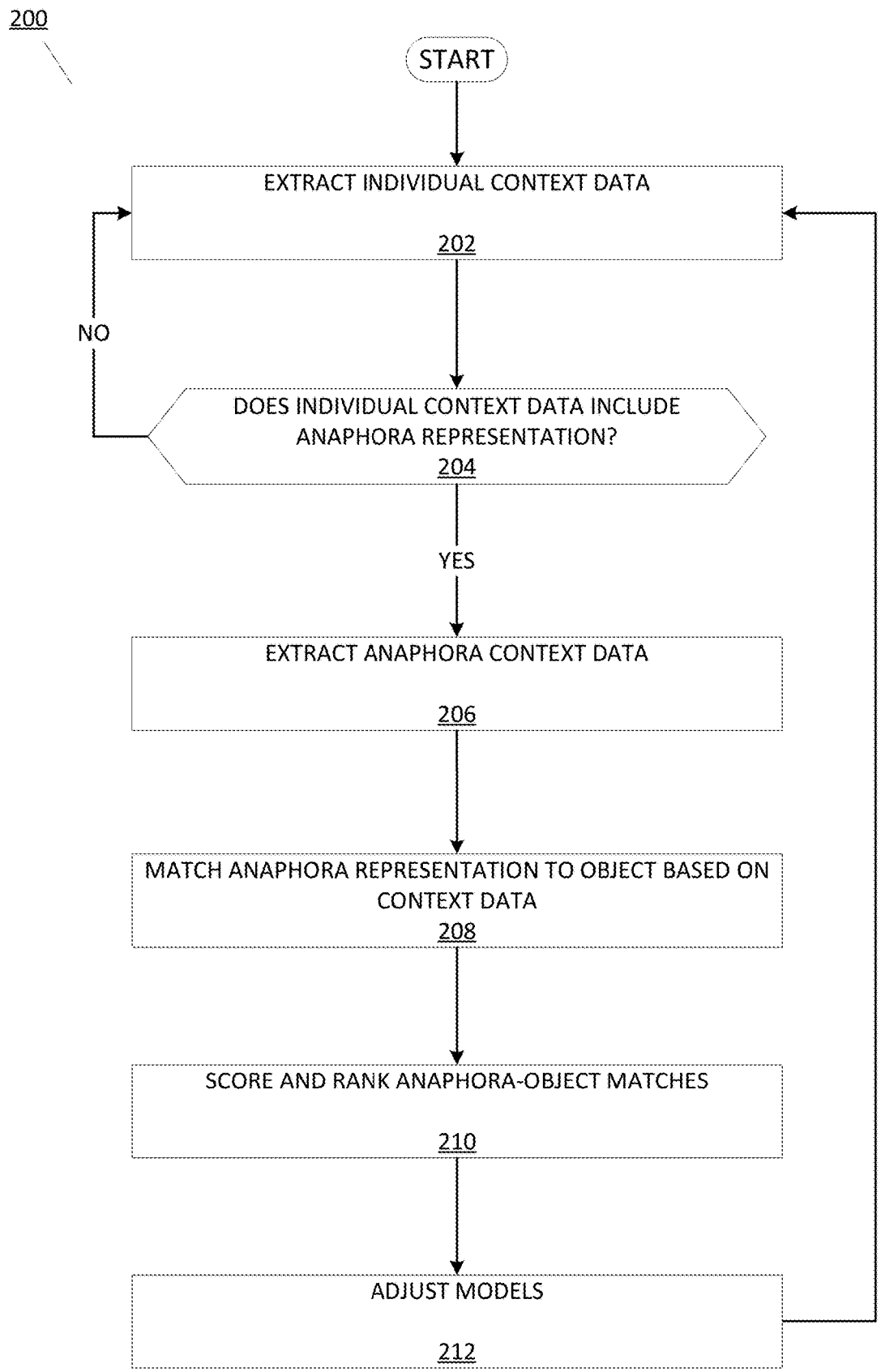
FIG. 2 depicts an exemplary flowchart 200 illustrating the operations of the anaphora resolver 132 of the anaphora resolving system 100, in accordance with the exemplary embodiments.

FIG. 2 depicts an exemplary flowchart 200 illustrating the operations of the anaphora resolver 132 of the anaphora resolving system 100, in accordance with the exemplary embodiments.

The anaphora resolver 132 may extract individual context data (step 202). In exemplary embodiments, the anaphora resolver 132 may extract individual context data from dialogue and/or actions between one or more individuals within an environment in order to facilitate identifying an object of an anaphora representation made between the individuals. The individual context data may include data relating to a number of individuals within the environment, identities of the individuals, individuals identified as speaking, positions of the individuals (e.g., coordinates in a 3-d space), groupings of the individuals, orientations of the individuals relative to the speaker/one or more objects, line of sight, etc. In exemplary embodiments, the anaphora resolver 132 may detect and identify individuals using the sensor(s) 110 in combination with techniques such as image and video analysis, audio analysis, template matching, faceprint or voiceprint identification, entity extraction, etc. In another embodiment, the sensor(s) 110 may be implemented as a network, such as a WiFi network, and individuals may be identified and positions deduced based on a WiFi connection. Moreover, the anaphora resolver 132 may identify those as speaking, as well as positions, groupings, and orientations of the individuals, using techniques such as audio to video matching, triangulation, trilateration, spatial analysis, temporal analysis, etc. In addition, the anaphora resolver 132 may reference the sensor 110 implemented as smart device or a wearable, such as smart glasses or a smart watch, in order to extract positioning, line of sight, movement, etc., of an individual. For example, the anaphora resolver 132 may determine a line of sight based on a video or image feed from a pair of smart glasses worn by an individual, or position within an area based on a smart watch.

In addition, the individual context data may further include natural language data and/or expression of the one or more individuals detected within the environment, such as audio, textual, and gestural dialogue (step 202 continued). The anaphora resolver 132 may extract the natural language data by first detecting text, audio, or gesture emitted by the individuals via the sensor 110, which may be in the form of a microphone, camera, smart device, or other sensor, and may be mounted within an environment, mobile, worn by a user, etc. In embodiments wherein the natural language is audible and/or speech, the anaphora resolver 132 may implement the sensor(s) 110 as a microphone and extract, translate, transcribe, etc., the detected audio. In addition, the anaphora resolver 132 may implement the sensor(s) 110 as a camera and utilize lip reading technology to extract natural language. Similarly, the anaphora resolver 132 may be configured to extract natural language from gestures, such as pointing, waving, sign language, etc., by implementing the sensor(s) 110 as a camera and with reference to databases associating gestures and sign language with natural language. In embodiments wherein the natural language is text, the anaphora resolver 132 may implement the sensor(s) 110 as a smart device, for example a smart phone or laptop, and intercept text dialogue shared via message, social network, etc. In general, the anaphora resolver 132 may implement any techniques and strategies for extracting individual context data via the sensor(s) 110. Having extracted audio, video, etc. of individual natural language, the anaphora resolver 132 may then apply natural language processing and understanding techniques to the extracted natural language in order to determine the natural language that has been communicated.

Figures 3, 4:
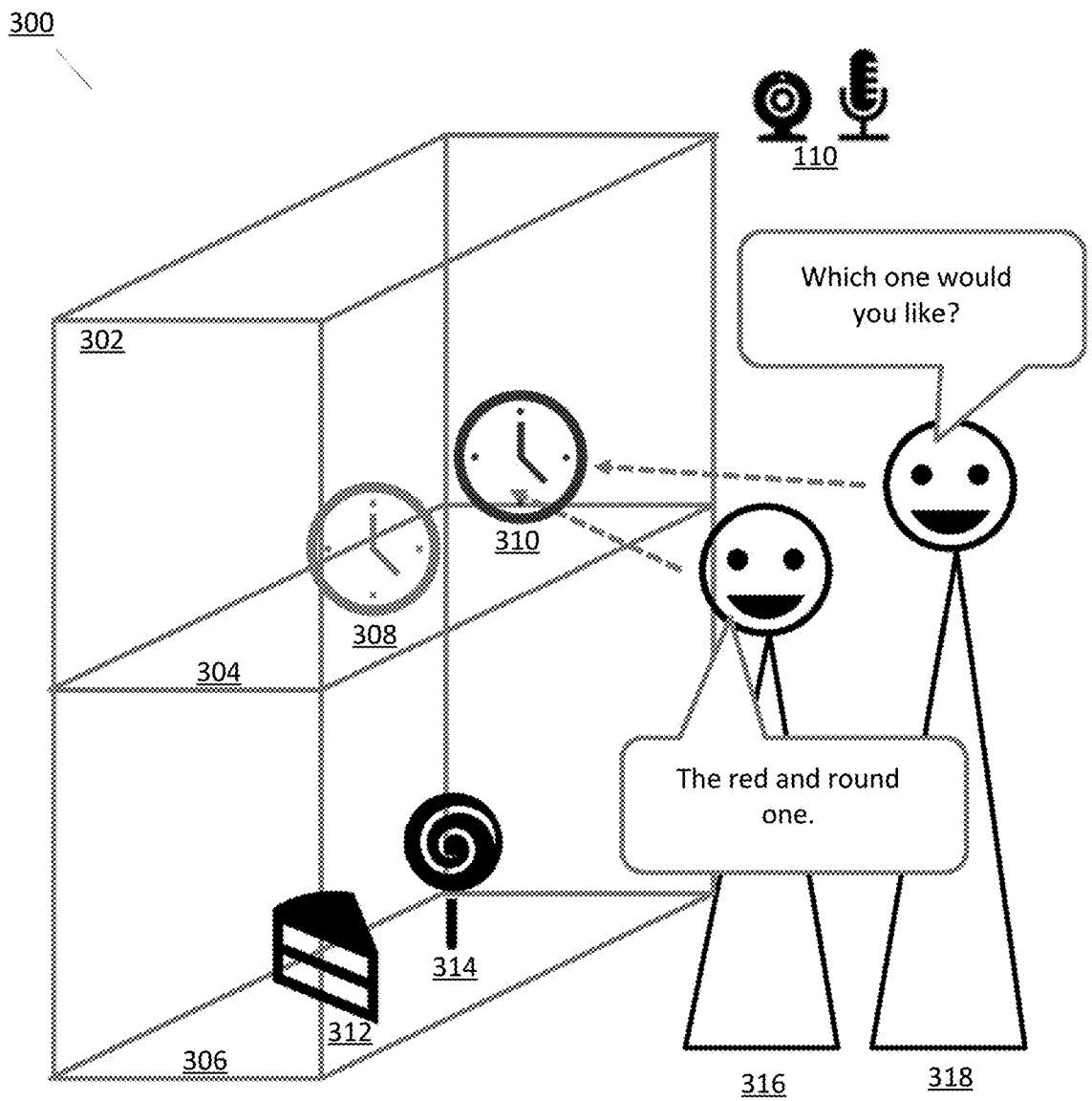
FIG. 3 depicts an exemplary schematic diagram of an environment 300 in which the anaphora resolving system 100 may be implemented, in accordance with the exemplary embodiments.
FIG. 4 depicts an exemplary table 400 representing data stored on an object database server 120 of the anaphora resolving system 100, in accordance with the exemplary embodiments.

In order to better illustrate the operations of the anaphora resolver 132, reference is now made to an illustrative example depicted by FIG. 3-4 in which an individual 316 and an individual 318 are discussing commodities displayed by a shelf 202 in a retail setting. Here, the anaphora resolver 132 utilizes the sensor 110 as a camera and microphone combination device in order to extract dialogue between the individuals stating "Which one would you like?" and a response of "The black and round one." In addition, the anaphora resolver 132 extracts identities, positions, and lines of sight of the individuals 316 and 318 relative to the environment using the sensor 110 as a camera.

The anaphora resolver 132 may determine whether the individual language contains one or more anaphora representations (decision 204). In exemplary embodiments, the anaphora resolver 132 may determine whether the user language contains one or more anaphora representations by utilizing several natural language processing techniques. In embodiments, the anaphora resolver 132 may identify anaphora representations using a rule based approach or, for example template and/or pattern matching. In addition, the anaphora resolver 132 may further implement machine learning techniques, for example using parts of speech analysis, entity extraction, models, reference to a corpus, etc., to learn correspondence between an anaphora and other parts of speech. In other embodiments, however, the anaphora resolver 132 may implement other techniques for detecting an anaphora within user dialogue or expression.

In furthering the illustrative example depicted by FIG. 3-4 wherein the dialogue includes "Which one would you like?" and "The black and round one," the anaphora resolver 132 determines that the term "one" in both sentences is an anaphora representation based on machine learning and template matching techniques.

The anaphora resolver 132 may extract anaphora context data from the individual context data (step 206). In exemplary embodiments, anaphora context data includes items relating to the identified anaphora representation and corresponding object. Such anaphora context data may include a color, shape, placement, size, time, etc., of an object to which an anaphora refers. In order to extract anaphora context data, the anaphora resolver 132 may extract keywords and topics from the individual context data, such as audio or text referring to colors, sizes, shapes, locations, times, etc. In addition, the anaphora resolver 132 may further extract anaphora context data from other individual context data, such as locations to which one or more individuals are pointing, an orientation of the individuals, a line of sight of the individuals, etc. The anaphora resolver 132 may extract the anaphora context data from one or more words, sentences, paragraphs, etc., adjacent to the identified anaphora. For example, the anaphora resolver 132 may perform natural language processing with a dependency analysis on the n sentences before and after the identified anaphora representation(s). Moreover, the anaphora resolver 132 may record and associated such individual context data and anaphora context data with the identified individuals such that the anaphora resolver 132 may generate individual profiles in order to track individual interests, hobbies, trends, patterns, etc. The anaphora resolver 132 may further utilize the individual profile information in extracting anaphora context data based on tendencies, probabilities, etc. by incorporating the profile data into future anaphora resolutions. For example, if an individual has referred to clocks often in the past, it may be more likely that an individual is referring to a clock currently.

With reference to the illustrative example above that included the natural language "Which one would you like?" and "The black and round one," the anaphora resolver 132 extracts the anaphora context data of "black" and "round" based on black and round being part of the topics color and shape, respectively. In addition, had an individual pointed or gestured towards a particular object, the anaphora resolver 132 would further extract information regarding a direction of the gesture made by the individuals.

The anaphora resolver 132 may match the anaphora representation(s) to a one or more objects (step 208). In embodiments, the anaphora resolver 132 may match the anaphora representation to an object by comparing both the extracted individual context data and the extracted anaphora context data to object data detailed by the object database 122. In embodiments, the anaphora resolver 132 may compare individual context data such position, orientation, line of sight, etc., with the locations of objects detailed by the object database 122. For example, the anaphora resolver 132 may utilize a location and orientation of one or more individuals to determine that the individuals are looking in the direction of a particular shelf and line of sight to determine that the individuals are looking at a top display of the shelf. Moreover, the anaphora resolver 132 may compare anaphora context data such as color, shape, size, etc., of an object with the color, shape, size, etc., data of objects detailed by the object database 122. For example, the anaphora resolver 132 may compare a color, shape, size, or release date described by the individuals with colors, shapes, sizes, or release dates of objects detailed by the object database 122. For each object considered in the comparisons, the anaphora resolver 132 may determine an object match score for each comparison made (e.g., a score for each of position, orientation, line of sight, color, shape, size, etc.) and combine the object match scores to determine an overall object match score for each of the objects as it relates to each of the identified anaphora representations.

In embodiments, the anaphora resolver 132 may consider any or all of the object match scores above, as well as any others, when determining the overall object match score for each object considered (step 208 continued). In embodiments, the anaphora resolver 132 may consider the object match scores as features within a model where each feature is weighted in calculating the overall object match scores. For example, those features determined to highly correlate an anaphora representation to an object may be more heavily weighted than those that are not. For each object, the anaphora resolver 132 may then, for example, multiple the features by the associated weights and sum the object match scores to determine the overall object match score. Such models may be generated and trained using techniques such as machine learning, neural nets, regression, etc. When applicable, the anaphora resolver 132 may be configured to identify one or more objects to which the anaphora is referring. Moreover, the anaphora resolver 132 may be configured to consider other anaphoras when identifying the object of a particular anaphora. For example, if an individual exclaims "It's the one above that one," then the anaphora resolver 132 may first determine an object to which "above that one" is referring prior to determining what "the one" is.

Referring again to the previously introduced example, the anaphora resolver 132 determines object match scores between the anaphora representation and the shelf 302, the clock 308, the clock 310, the cake 312, and the lollipop 314, as detailed by the object database 122. The anaphora resolver 132 additional sums the object match scores to determine the overall object match scores as a 95% match to the clock 310, a 65% match to the clock 308, a 30% match to the lollipop 314, and a 10% match to the cake 312.

The anaphora resolver 132 may score and rank the anaphora-object matches (step 210). Based on the comparison of the anaphora representation to the objects detailed by the object database 122, the anaphora resolver 132 may score the potential objects based on a probability that it is the object to which the anaphora refers. In addition, the anaphora resolver 132 may rank the scored potential objects and, in embodiments, associate the scores, individual context data, and anaphora context data with the objects within the object database 122. In embodiments, the anaphora resolver 132 ranks an object with a highest match as a most probable object to which the anaphora is referring. The anaphora resolver 132 may output the highest ranked object to a user interface, to another computing device, etc. For example, the anaphora resolver 132 may ask an individual whether that is the object to which they are referring via text, push notification, email, etc., or use/forward the object for use in natural language processing and understanding applications.

With reference to the previously introduced example, the anaphora resolver 132 ranks the clock 310 as a most probable object to which the anaphora "the black and round one" refers, and utilizes the clock 310 in natural language processing of the dialogue between the individuals 316 and 318.

The anaphora resolver 132 may adjust models (step 212). In embodiments, the anaphora resolver 132 may adjust models based on determining whether the correct object to which the anaphora is referring was identified. For example, the anaphora resolver 132 may continue to extract individual context data and anaphora context data in order to reanalyse whether the correct object was initially identified. If the anaphora resolver 132 later determines that a different object is more probably the object referred to by the anaphora than the original, the anaphora resolver 132 may adjust weights associated with features originally relied upon. In addition, the anaphora resolver 132 may reference the sensor(s) 110 in order to determine whether an individual ultimately selected, pickup up, used, etc., the originally identified object, thereby confirming the identified object. In other embodiments, the anaphora resolver 132 may implement other methods of a feedback loop, for example receiving user input by an individual or administrator.

Referring again to the previously introduced example, the anaphora resolver 132 adjust weights associated with features based on the individual ultimately selecting the clock 308 rather than the clock 310.

FIG. 3 depicts an exemplary schematic diagram of an environment 300 in which the anaphora resolving system 100 may be implemented, in accordance with the exemplary embodiments.

FIG. 3 depicts an embodiment in which the anaphora resolving system 100 is implemented within a retail setting. The exemplary environment 300 may include a retail shelf 302, a user 316, a user 318, and the sensor 110. The retail shelf 302 may include a middle stage shelf plate 304 and a lower stage shelf plate 306 for display of objects, such as commodities. The middle stage shelf plate 304 may include a gray clock 308 and a black clock 310 while the lower stage shelf plate 306 may include a cake 312 and a lollipop 314. In the exemplary environment 300, the sensor(s) 110 may be configured to detect and measure user natural language and gestural data, such as user speech, text, or action. In addition, the sensor 110 may be configured to detect and measure individual context data, such as a position, motion, line of sight, movement, gestures, etc., with respect to the user 316 and the user 318 within the environment 300. In some embodiments, the sensor(s) 110 may be further configured to detect and measure object context data, such as object position, shape, size, color, movement, etc., with respect to objects 308, 310, 312, and 314.

FIG. 4 depicts an exemplary table 400 representing data stored on an object database server 120 of the anaphora resolving system 100, in accordance with the exemplary embodiments. More specifically, the table 400 illustrates an exemplary commodity table detailed by the object database 122 corresponding to objects within the environment 300 of FIG. 3.

Figure 5:
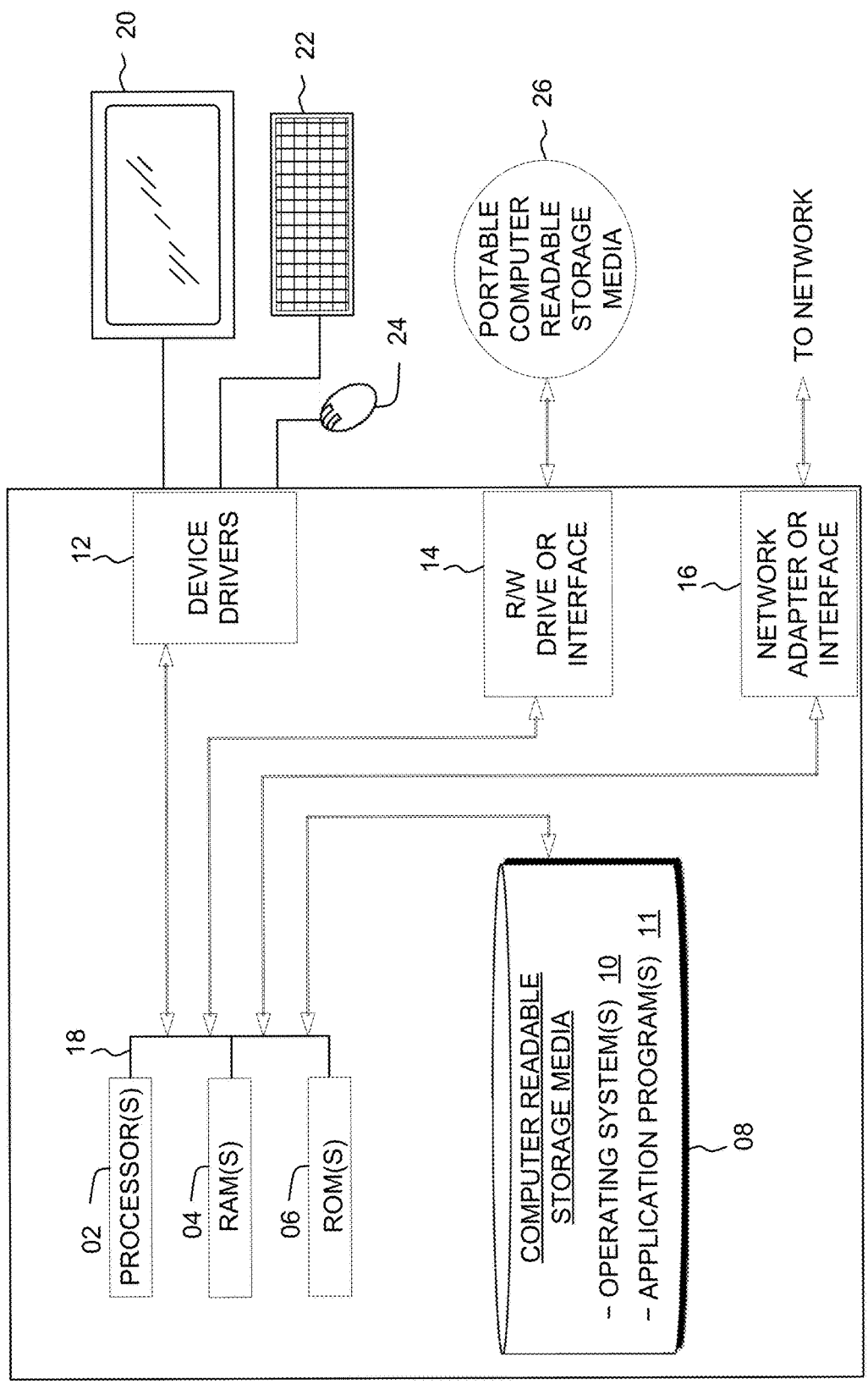
FIG. 5 depicts an exemplary block diagram depicting the hardware components of the anaphora resolving system 100 of FIG. 1, in accordance with the exemplary embodiments.

FIG. 5 depicts a block diagram of devices within the anaphora resolving system 100 of FIG. 1, in accordance with the exemplary embodiments. It should be appreciated that FIG. 5 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
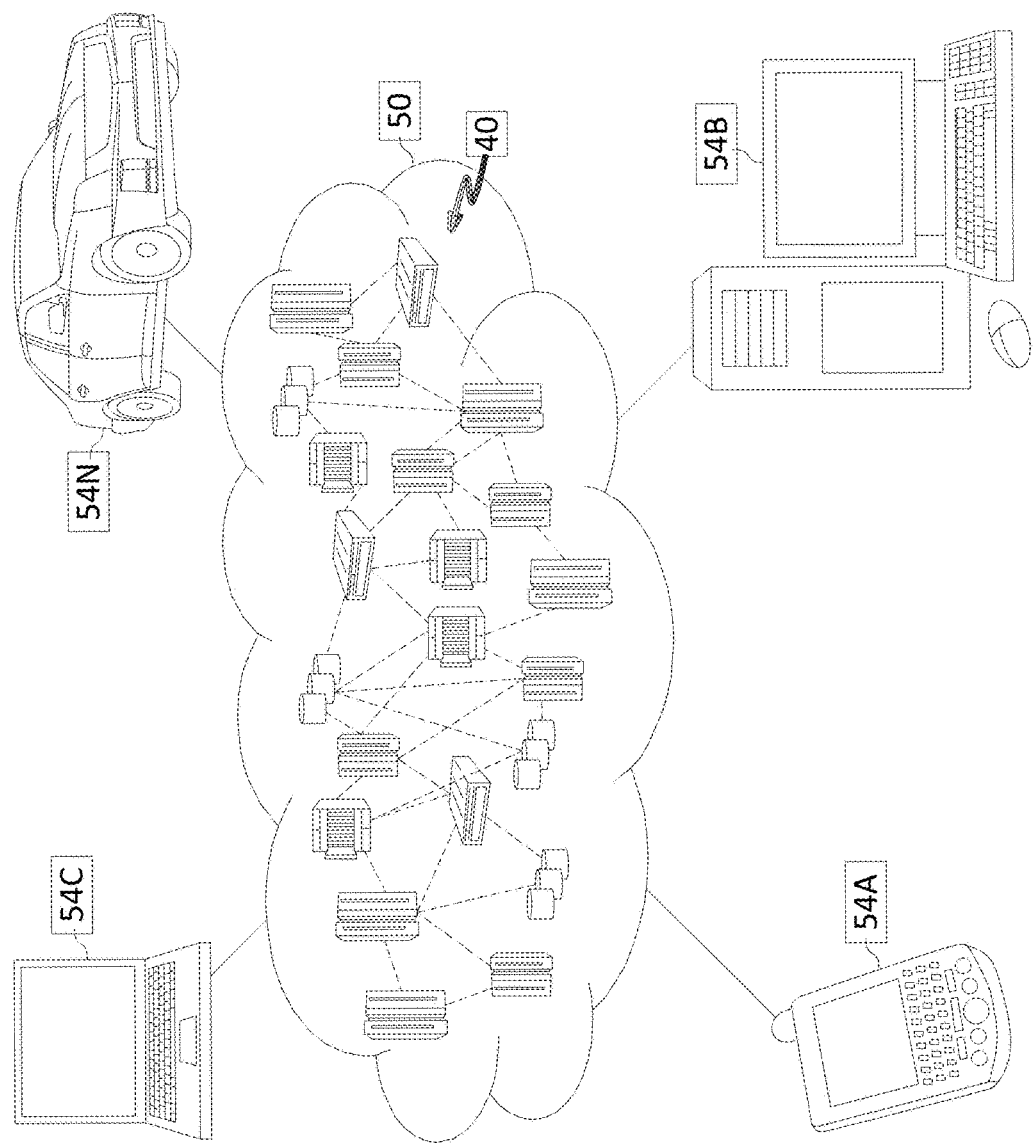
FIG. 6 depicts a cloud computing environment, in accordance with the exemplary embodiments.

Referring now to FIG. 6, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 40 and cloud computing environment 50 can communicate with any type of computerized device over any type of network and/or network addressable connection (e.g., using a web browser).

Figure 7:
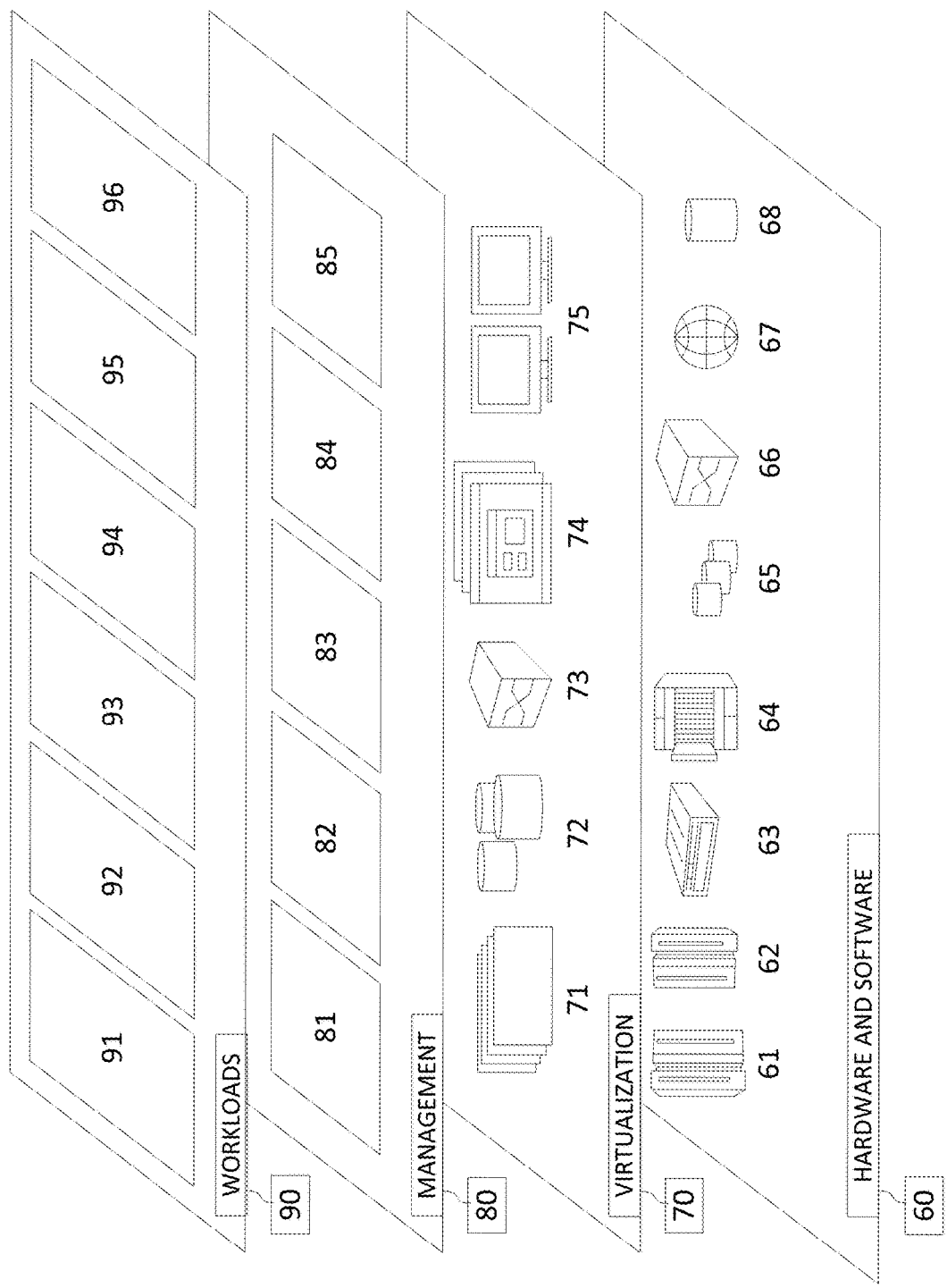
FIG. 7 depicts abstraction model layers, in accordance with the exemplary embodiments.

Referring now to FIG. 7, a set of functional abstraction layers provided by cloud computing environment 50 (FIG. 6) is shown. It should be understood in advance that the components, layers, and functions shown in FIG. 7 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and anaphora processing 96.

The exemplary embodiments may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for resolving an anaphora, the method comprising:
    extracting individual context data from an individual expression;
    determining whether the individual expression includes an anaphora representation based on the individual context data;
    based on determining that the individual expression includes the anaphora representation, extracting anaphora context data; and
    identifying an object of one or more objects to which the anaphora representation refers based on comparing the individual context data and the anaphora context data to data detailing the one or more objects.

2. The method of claim 1, wherein identifying the object of the one or more objects to which the anaphora representation refers further comprises:
    extracting metadata corresponding to the one or more objects; and
    comparing the metadata corresponding to the one or more objects to the individual context data and the anaphora context data.

3. The method of claim 2, further comprising:
    determining an object match score for each comparison of the metadata to the individual context data and the anaphora context data; and
    determining an overall object match score for each of the one or more objects as it relates to resolving the anaphora representation.

4. The method of claim 3, wherein determining the overall object match score for each of the one or more objects as it relates to resolving the anaphora representation further comprises:
    generating a model that weights each comparison;
    multiplying the weight by the comparison; and
    summing the product of the multiplied, weighted comparisons.

5. The method of claim 1, wherein the anaphora context data includes data selected from a group comprising an object color, an object shape, an object placement, an object size, and an object time.

6. The method of claim 1, wherein the individual context data includes data selected from a group comprising a number of individuals within an environment, identities of the individuals, individuals identified as speaking, relative positions of the individuals, groupings of the individuals, orientations of the individuals relative to the speaker, orientations of the individuals relative to one or more objects, and individual line of sight.

7. The method of claim 6, further comprising:
    generating an individual profile for at least one individual generating the individual expression; and
    wherein the individual context data includes the individual profile.

8. A computer program product for resolving an anaphora, the computer program product comprising:
    one or more non-transitory computer-readable storage media and program instructions stored on the one or more non-transitory computer-readable storage media capable of performing a method, the method comprising:
    extracting individual context data from an individual expression;
    determining whether the individual expression includes an anaphora representation based on the individual context data;
    based on determining that the individual expression includes the anaphora representation, extracting anaphora context data; and
    identifying an object of one or more objects to which the anaphora representation refers based on comparing the individual context data and the anaphora context data to data detailing the one or more objects.

9. The computer program product of claim 8, wherein identifying the object of the one or more objects to which the anaphora representation refers further comprises:
    extracting metadata corresponding to the one or more objects; and
    comparing the metadata corresponding to the one or more objects to the individual context data and the anaphora context data.

10. The computer program product of claim 9, further comprising:
    determining an object match score for each comparison of the metadata to the individual context data and the anaphora context data; and
    determining an overall object match score for each of the one or more objects as it relates to resolving the anaphora representation.

11. The computer program product of claim 10, wherein determining the overall object match score for each of the one or more objects as it relates to resolving the anaphora representation further comprises:
    generating a model that weights each comparison;
    multiplying the weight by the comparison; and summing the product of the multiplied, weighted comparisons.

12. The computer program product of claim 8, wherein the anaphora context data includes data selected from a group comprising an object color, an object shape, an object placement, an object size, and an object time.

13. The computer program product of claim 8, wherein the individual context data includes data selected from a group comprising a number of individuals within an environment, identities of the individuals, individuals identified as speaking, relative positions of the individuals, groupings of the individuals, orientations of the individuals relative to the speaker, orientations of the individuals relative to one or more objects, and individual line of sight.

14. The computer program product of claim 13, further comprising:
   generating an individual profile for at least one individual generating the individual expression; and
   wherein the individual context data includes the individual profile.

15. A computer system for resolving an anaphora, the system comprising:
   one or more optical sensors, one or more strain gauge sensors, one or more microphones, one or more temperature sensors, and one or more batteries; one or more computer processors, one or more computer-readable storage media, and program instructions stored on the one or more of the computer-readable storage media for execution by at least one of the one or more processors capable of performing a method, the method comprising:
   extracting individual context data from an individual expression;
   determining whether the individual expression includes an anaphora representation based on the individual context data;
   based on determining that the individual expression includes the anaphora representation, extracting anaphora context data; and
   identifying an object of one or more objects to which the anaphora representation refers based on comparing the individual context data and the anaphora context data to data detailing the one or more objects.

16. The computer system of claim 15, wherein identifying the object of the one or more objects to which the anaphora representation refers further comprises:
   extracting metadata corresponding to the one or more objects; and
   comparing the metadata corresponding to the one or more objects to the individual context data and the anaphora context data.

17. The computer system of claim 16, further comprising:
   determining an object match score for each comparison of the metadata to the individual context data and the anaphora context data; and
   determining an overall object match score for each of the one or more objects as it relates to resolving the anaphora representation.

18. The computer system of claim 17, wherein determining the overall object match score for each of the one or more objects as it relates to resolving the anaphora representation further comprises:
   generating a model that weights each comparison;
   multiplying the weight by the comparison; and
   summing the product of the multiplied, weighted comparisons.

19. The computer system of claim 15, wherein the anaphora context data includes data selected from a group comprising an object color, an object shape, an object placement, an object size, and an object time.

20. The computer system of claim 15, wherein the individual context data includes data selected from a group comprising a number of individuals within an environment, identities of the individuals, individuals identified as speaking, relative positions of the individuals, groupings of the individuals, orientations of the individuals relative to the speaker, orientations of the individuals relative to one or more objects, and individual line of sight.

* * * * *